United States Patent [19]

Rush, II et al.

[11] Patent Number: 4,549,506
[45] Date of Patent: Oct. 29, 1985

[54] ENGINE INTAKE SYSTEM WITH MODULATED TUNING

[75] Inventors: William B. Rush, II, Clarkston; Rodney B. Rask, Grosse Pointe Woods, both of Mich.

[73] Assignee: General Motors Corporation, Detroit, Mich.

[21] Appl. No.: 600,414

[22] Filed: Apr. 16, 1984

[51] Int. Cl.⁴ .............................................. F02B 27/00
[52] U.S. Cl. .............................................. 123/52 MB
[58] Field of Search .......... 123/52 M, 52 MB, 52 MV

[56] References Cited

U.S. PATENT DOCUMENTS

| | | | |
|---|---|---|---|
| 1,763,726 | 6/1930 | Timian | 123/52 MB |
| 1,890,567 | 12/1932 | Baverey | 123/52 MB |
| 2,126,649 | 8/1938 | Lytle et al. | 123/52 MB |
| 2,172,957 | 9/1939 | Firth | 123/52 M |
| 2,315,215 | 3/1943 | Maybach | 123/52 MB |
| 2,323,442 | 7/1943 | Beard | 123/52 MB |
| 2,766,743 | 10/1956 | Platner et al. | 123/52 MV |
| 2,862,490 | 12/1958 | Trisler | 123/52 MB |
| 2,916,027 | 12/1959 | Chayne et al. | 123/52 MV |
| 3,146,764 | 9/1964 | Elsbett | 123/52 M |
| 3,370,575 | 2/1968 | Soubis | 123/52 M |
| 3,491,733 | 1/1970 | Soubis | 123/52 M |
| 3,796,048 | 3/1974 | Annus et al. | 123/52 M |
| 3,943,906 | 3/1976 | Hirose et al. | 123/575 |
| 4,030,459 | 6/1977 | Hori et al. | 123/52 M |
| 4,300,488 | 11/1981 | Cser | 123/52 M |
| 4,353,211 | 10/1982 | Cser et al. | 123/52 M |

FOREIGN PATENT DOCUMENTS

| | | | |
|---|---|---|---|
| 0115818 | 9/1981 | Japan | 123/52 MB |
| 0127850 | 9/1919 | United Kingdom | 123/52 MB |

Primary Examiner—Craig R. Feinberg
Attorney, Agent, or Firm—Robert J. Outland

[57] ABSTRACT

Modulated tuning intake systems for multi-cylinder internal combustion engines are described wherein dual plenums are each connected to essentially half the engine cylinders and tuned to provide enhanced charging efficiency in a predetermined, normally lower, range of engine speeds. A controlled valved connector or tube is provided between the plenums to effectively modify or eliminate their separate character by joining them at other selected engine speeds, such as the middle and higher speed ranges, thus providing enhanced charging efficiency at these speeds and obtaining improved volumetric cylinder charging efficiency over all, or a major portion, of the engine operating speed range.

2 Claims, 9 Drawing Figures

ENGINE INTAKE SYSTEM WITH MODULATED TUNING

TECHNICAL FIELD

This invention relates to intake systems for multi-cylinder combustion engines and more particularly to intake manifolds and/or systems having tuning modulating means to advantageously change the tuning characteristics of an induction system during engine operation.

BACKGROUND

It is known in the art relating to internal combustion engines that the cylinder charging characteristics of a multi-cylinder engine may be enhanced in one or more portions of its speed range by providing a tuned induction system and/or manifold for conducting the intake air or charge to the engine cylinders. The location and speed range of enhanced charging of a tuned intake system is dependent upon a number of factors which are generally known in the art and thus will not be discussed at length in this disclosure. These factors include, among others, the size and number of plenums, the length of plenum to cylinder runners and the length of intake, or zip, tubes leading to the plenum or plenums.

In a known arrangement where a single plenum is connected to all cylinders of a multi-cylinder engine, charge enhancing resonance is strongest (reaching a peak) toward the higher end of the engine speed range. An alternative arrangement using dual plenums, each connected with half the engine cylinders, and joined by zip tubes to a common air cleaner chamber, provides tuning that strongly enhances the charging effect in the lower engine speed range but drops off in the higher range to a level lower than that of the single plenum manifold. If the advantages of both arrangements could be incorporated in a single system, improved charging efficiency and engine performance could be provided over all, or a greater portion, of the engine speed range.

SUMMARY OF THE INVENTION

The present invention provides engine induction systems with modulated or variable tuning characteristics that take advantage of the beneficial effects attributable to the more efficient ranges of both dual and single plenum systems. To accomplish this, the systems provide dual plenums fed by separate intake, or zip, tubes and each connected by individual runners with a group, preferably consisting of half of the engine cylinders. The zip tubes are preferably connected with a common air cleaner chamber.

In one embodiment of the invention, the separate plenums are directly communicated with one another through a large area to provide substantially the equivalent of one larger plenum connecting with all the cylinders and a modulating valve is provided to selectively close off communication between the plenums and obtain the dual plenum effect. By closing the valve in the lower engine speed range and opening it in the higher speed range, advantage is taken of the greater charge enhancement provided by the dual plenum system in the lower speed range and the single plenum system in the higher speed range. As a result, charging efficiency and performance are improved over the entire engine speed range.

Alternative arrangements of modulated intake systems, generally in accordance with the broader principles of the invention, provide dual intake plenums wherein the tuning effect is modulated by connection through valved passages extending externally of the plenums. In one alternative embodiment, a valved connection between the zip tubes is made at one or more suitable locations between the separate plenums and the common chamber. Opening of the valved connection changes the tuning effect by reducing the effective tuning length of the zip tubes leading to the plenums. In alternative embodiments, valved conduits separate from the zip tubes may be arranged to connect the plenums at other locations, with the length and area of the connecting conduits determining the variable tuning effects.

These and other embodiments, features and advantages of the invention will be more fully understood from the following detailed description taken together with the accompanying drawings.

BRIEF DRAWING DESCRIPTION

DETAILED DESCRIPTION

Figure 1:
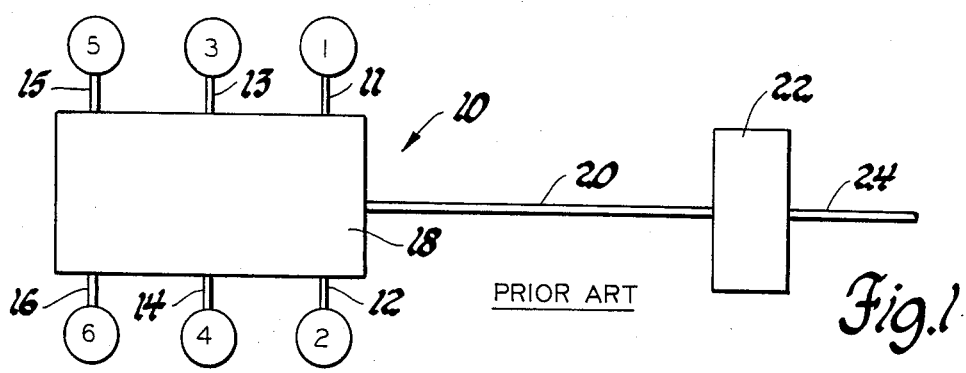
FIG. 1 is a schematic view illustrating one form of prior art single plenum tuned intake system for a V-type engine.

Referring now to the drawings in detail, wherein the corresponding elements of the various arrangements are indicated by like reference numerals, numeral 10 generally indicates a prior art single plenum tuned intake system for a V-6 internal combustion engine, of which only the cylinders 1-6 are shown. These cylinders are individually connected by runners 11-16, respectively, with a single plenum 18 of substantial volume. An intake tube or zip tube 20 connects the front end of the plenum 18 with an air cleaner 22 which, in turn, receives intake air into the intake system through a snorkel 24.

With manifold arrangements of this sort where the plenum is sufficiently large, the range of engine speeds in which cylinder charging enhancement around a single tuning peak occurs is determined primarily by runner lengths. In most applications the runner length is such that the tuning peak occurs in or above the upper speed range of an engine, producing excellent high speed performance. In general, however, such designs are not effective in improving performance in the lower engine speed ranges.

Figure 2:
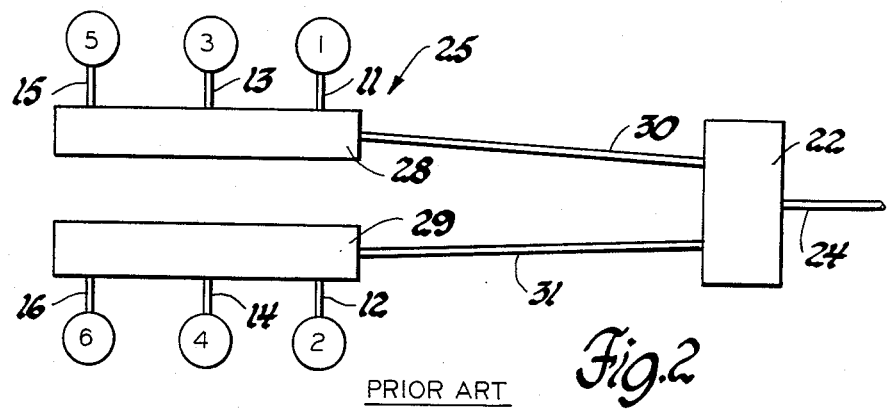
FIG. 2 is a schematic view similar to FIG. 1 but illustrating a dual plenum engine intake system.

FIG. 2 of the drawings illustrates a dual plenum intake system for a V-6 type engine and generally indicated by numeral 25. This system differs from that of FIG. 1 in that individual laterally spaced left and right plenums 28 and 29, respectively, are provided that are respectively connected to the cylinders of the left and right engine cylinder banks, not shown. Left plenum 28 is, thus, connected through runners 11, 13 and 15 with cylinders 1, 3 and 5, respectively. Plenum 29 is connected through runners 12, 14 and 16 with cylinders 2, 4 and 6, respectively. Separate zip tubes are also provided, including a zip tube 30 connecting the front end of the left plenum 28 with the air cleaner 22 and a zip tube 31 connecting the front end of the right plenum 29 with the air cleaner 22. The air cleaner thus defines a common chamber connecting with the inlet ends of and feeding both zip tubes and their connected plenums and cylinder groups. However, if desired, the inlet ends of the zip tubes could be connected to separate air cleaners or open to atmosphere.

A dual plenum arrangement of the type shown in FIG. 2, when connected as shown with the cylinders of a four-stroke cycle engine, generally provides a dual resonance system that gives improved performance at two engine speed ranges, a low speed range influenced primarily by the plenum volume and zip tube dimensions and a higher speed range influenced primarily by the runner lengths. With the short runners common in many automobile intake manifold designs, the high speed peak may be above the useful speed range of the engine, however, the dual plenum system generally produces a very pronounced low speed tuning peak with a drop off of volumetric efficiency in the medium and higher speed ranges.

Figure 3:
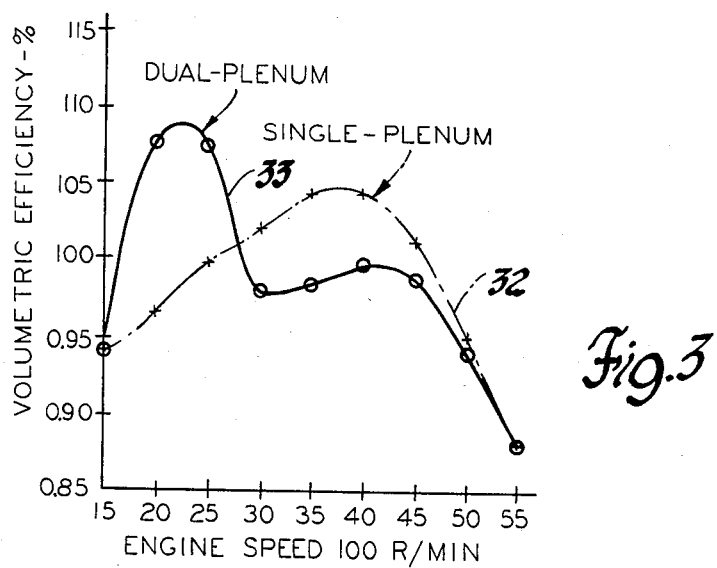
FIG. 3 is a graph illustrating volumetric efficiencies of two systems of the types shown in FIGS. 1 and 2 at various engine speeds.

FIG. 3 graphically illustrates the efficiency performance of exemplary versions of the prior art arrangements of FIGS. 1 and 2. The dashed curved labeled "single plenum" and indicated by numeral 32 shows volumetric efficiency versus engine speed for an embodiment of the type illustrated in FIG. 1. Note that volumetric charging efficiency is above 100% in a broad speed range extending from the middle to the upper ranges of engine operating speed but drops below 100% in the lower speed range. The solid curve labeled "dual plenum" and indicated by numeral 33 shows the comparative charging efficiency for a dual plenum prior art system of the type shown in FIG. 2. Note here that volumetric efficiency extends well above 100% in the lower speed range but drops below it in the middle and higher ranges of engine speed, although a slight improvement over the mid-speed range is present at higher speeds.

It may be seen from the overlay of the two curves for volumetric charging efficiency that the dual plenum arrangement of FIG. 2 provides better performance in the low speed range of the engine, while the single plenum arrangement of FIG. 1 provides better performance in the middle and high engine speed ranges. The present invention provides arrangements which take advantage of the performance improving characteristics of both prior art embodiments by providing intake systems in which tuning can be modulated to provide the charging efficiency improvement of the dual plenum arrangement in the lower engine speed range while also taking advantage of the improved performance of the single plenum arrangement in the upper speed range of engine operation.

PREFERRED EMBODIMENT

Figure 4:
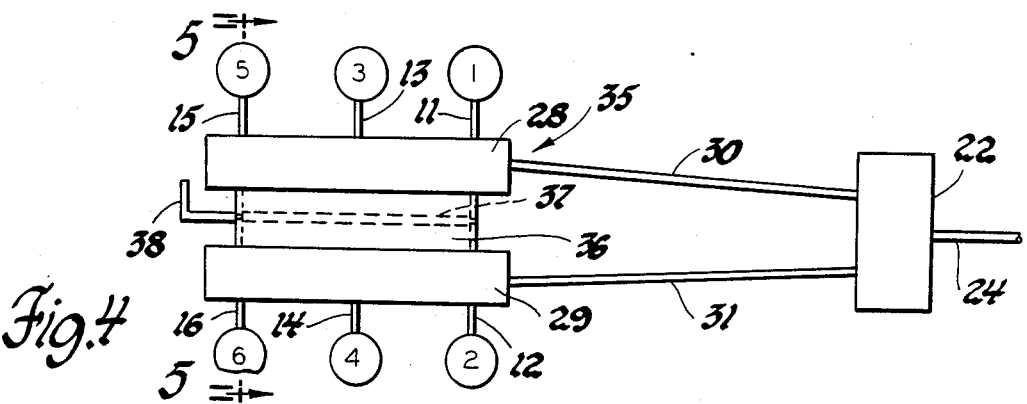
FIG. 4 is a schematic view illustrating an exemplary embodiment of modulated tuning intake system in accordance with the invention.
Figure 5:
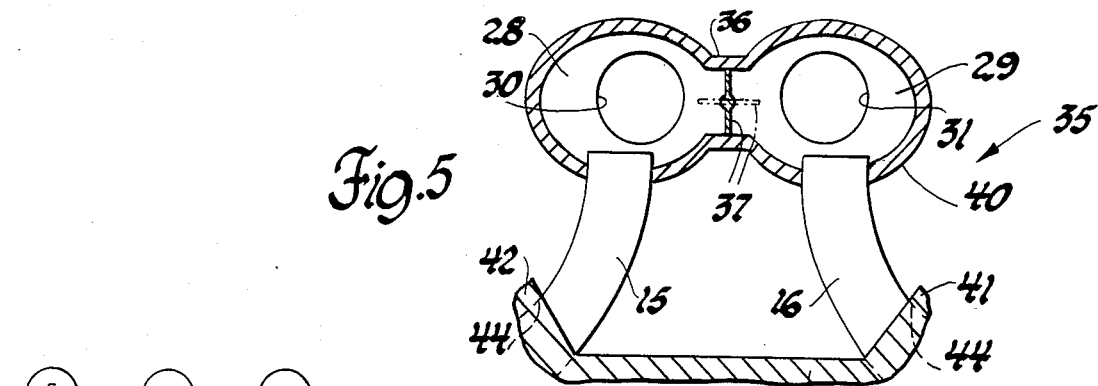
FIG. 5 is a cross-sectional view of the mounted manifold in the system of FIG. 4 as viewed generally from the plane indicated by the line 5—5 of FIG. 4.

FIGS. 4 and 5 illustrate a preferred embodiment of modulated tuning intake system in accordance with the invention as applied to a V-6 type engine and generally indicated by numeral 35. The arrangement of FIG. 4 is similar to that of FIG. 2 with like numerals indicating corresponding components. It differs from the prior art arrangement in that the spaced dual plenums 28, 29 are laterally interconnected throughout most of their length by an integral connector body, or portion, 36 that closes the space between the plenums and provides open communication between them. A valve member 37 extends longitudinally within the connector portion 36 and is movable by an actuator 38 into closed and open positions shown in FIG. 5 by solid and phantom lines respectively. In the closed position, the valve 37 blocks communication between the two plenums 28, 29 so that they operate effectively as separate dual plenums. In the open position, the valve 37 permits free communication between the two plenums 28, 29 so that they operate effectively as a single larger plenum.

The interconnection of the plenums 28, 29 by the connector 36 and their attachment to the runners 11–16 defines a manifold 40 best seen in FIG. 5. Manifold 40 is conventionally mounted on the right and left cylinder banks 41, 42 respectively, of the engine block and head assembly 43 and connects with the various cylinders 1–6 through intake ports 44 in conventional manner.

In operation, suitable control means, including actuator 38, are provided for moving the valve 37 to its open and closed positions as a function of engine speed. When the engine speed is in the lower range, where the dual plenum system provides better charging efficiency, the valve is closed to provide the benefits of this operating mode. When the engine speed reaches the crossover point, where the dual and single plenum efficiencies are equal, the valve is opened upon increasing speed or closed on decreasing speed. Above this point, the valve is open so the system provides the improved volumetric efficiency advantages of the single plenum system. Thus, engine charging efficiency is maximized, or improved, over substantially the whole operating range of the engine by application of the modulated intake system 35 as shown in FIGS. 4 and 5.

The control means previously referred to, of which actuator 38 forms a part, may include any suitable forms of control and actuating devices capable of responding to engine speed to open and close the valve 37 at or near the crossover speed determined for the particular intake system. Such devices could include, for example, mechanical, electrical, electronic, hydraulic or pneumatic speed sensing and control means interconnected with a suitable two position controlled mechanism to move the actuator 38 to the valve open and closed positions.

MEASURED RESULTS

As a specific example, testing was conducted on a port fuel injected V-6 spark ignition engine of 3.8 L displacement. A dual-plenum manifold of the type shown in FIG. 4 was used on the engine. The zip tubes were 406×44.5 mm (16×1.75 inch) and the runners were approximately 203 mm (8 inches) long. With two 0.82 L (50 in$^3$) plenum halves isolated from each other by a separator, this design was intended to give a tuning peak in the low-mid range. The halves of the split plenum were connected by two throttle plates with 2097 mm² (3.25 in²) area in each plate.

Tests with the modulating throttle plates open produced results similar to a completely untuned system (the 203 mm runners have little effect at the speeds shown in FIG. 3). Testing with the modulating throttles closed gave an 11% increase in peak torque at 2700 r/min due to tuning. However, there was a 12% decrease in torque in the high speed range (4600–5200 r/min). With the modulating throttles closed below 3400 r/min and open above 3400 r/min, the performance obtained combines the best performance results of the two operating modes.

ALTERNATIVE EMBODIMENTS

Figure 6:
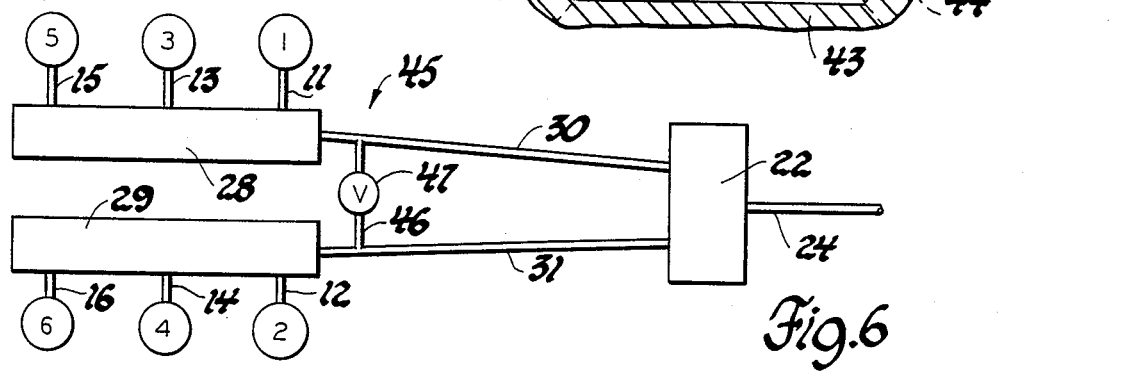
FIG. 6 is a schematic view similar to FIG. 4 but showing an alternative embodiment of intake system in accordance with the invention.
Figure 7:
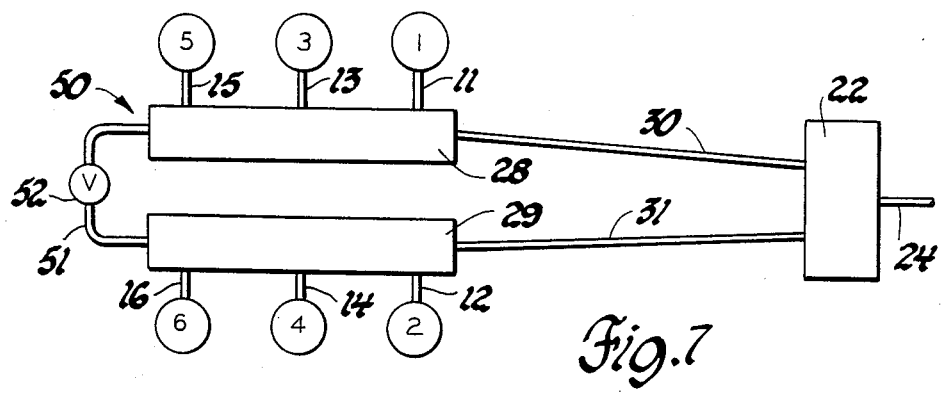
FIG. 7 is a schematic view illustrating a variation of the embodiment of FIG. 6.
Figure 8:
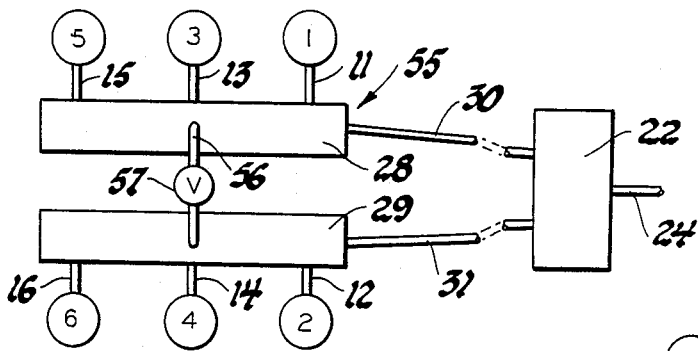
FIG. 8 is a schematic view illustrating another variation of the embodiment of FIG. 6.

FIGS. 6, 7 and 8 illustrate various alternative embodiments of modulated tuning intake systems in accordance with the invention. All of these systems include the elements of the dual plenum arrangement of FIG. 2 so that like numerals are used to indicate similar components.

FIG. 6 illustrates a modulated tuning intake system generally indicated by numeral 45. System 45 differs from the embodiment of FIGS. 4 and 5 in that the spaced dual plenums 28, 29 are not directly connected by a large connector portion. Instead, a more indirect connection, along a path having a length greater than the spacing between the plenums, is provided by means of a connector tube 46 extending between the zip tubes 30, 31 at a distance from the plenums 28, 29. A valve 47 is provided in the connector tube 46 to open or close its communication of the zip tubes.

When the valve 47 is closed, the intake system of FIG. 6 operates like the prior art dual plenum system 25 of FIG. 2 to provide a tuning peak in a lower engine speed range. However, when the valve 47 is opened, the tuning is modified by effectively shortening the path of communication between the manifolds provided in the dual plenum arrangement by the zip tubes and air cleaner. Then the system 45 provides operation more like the prior art single plenum arrangement 10 of FIG. 1 and gives enhanced volumetric efficiency in the mid and/or upper speed ranges of engine operation.

Operation of the valve 47 in the manner described for the valve of the system 35 will, thus, provide enhanced volumetric charging efficiency over part or all of engine speed range. Obviously, the size and length of the communicating passages will affect the specific tuning results obtained, as will numerous other factors known to those skilled in the art, such as the size and number of cylinders to which the system is connected.

If desired, it would be possible to provide more than one connector tube between the zip tubes at various locations between the plenums 28, 29 and the air cleaner 22. Selectively opening or closing the valves of the respective connector tubes could then provide tuned operation with peaks at various points along the engine speed range to, thus, obtain even greater improvement in charging efficiency over the total operating speed range of the engine.

In FIGS. 7 and 8, optional embodiments having elements of similarity to those of FIGS. 4 and 6 are illustrated wherein like numerals illustrate similar components. FIG. 7 illustrates a modulated intake system 50 in which the plenums 28, 29 are connected at their rear ends by a connector tube 51 containing a valve 52. The length of the tube 51 may be made substantially equal to that of the path defined in system 45 by the tube 46 and the portions of zip tubes 30, 31 between tube 46 and its connected plenums 28, 29. In such a case, the tuning effect of the arrangement of FIG. 7 could be similar to that of FIG. 6 since, when the valve 52 is opened, the plenums 28, 29 are communicated via the tube 51 through a short path of substantially the same length as that of the arrangement of FIG. 6.

In FIG. 8, a modulated tuning intake system 53 is shown wherein a connector tube 56 communicates the top portions of the plenums 28, 29 along a path having a length determined by the length of the tube 56. A valve 57 in the tube 56 operates in the manner indicated for the previously described embodiments to close or open communication and thereby provide the effects of either dual plenum or modified single plenum operation, as indicated with respect to the embodiments of FIGS. 6 and 7.

Figure 9:
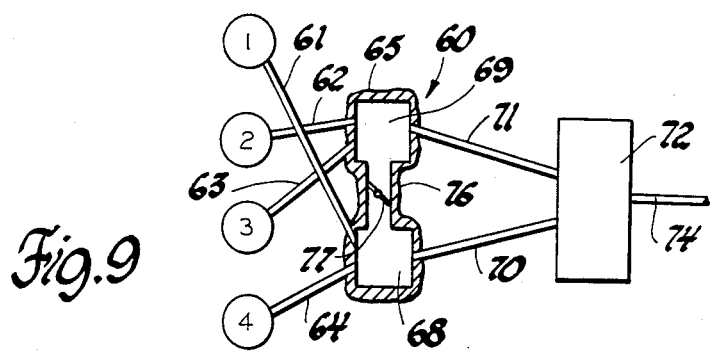
FIG. 9 is a schematic view illustrating the application of an induction system similar to the embodiment of FIG. 4 to an inline four cylinder engine.

FIG. 9 is included to illustrate that manifold arrangements in accordance with the present invention are not limited to V-type or to six cylinder engines, but may be applied to multi-cylinder engines of any suitable configuration and number of cylinders to which manifold tuning may be effectively applied. In the FIG. 9 arrangement, a modulated tuning intake system generally indicated by numeral 60, is applied to an inline engine having cylinders 1–4. Runners 61–64 respectively connect cylinders 1–4 with the plenums of a modulated intake manifold 65. Cylinders 1 and 4 are connected with a first plenum 68 while cylinders 2 and 3 are connected with a second plenum 69. Zip tubes 70, 71 respectively connect the plenums 68, 69 with an air cleaner 72 having a snorkel 74.

In a manner similar to that of the embodiment of FIG. 4, the plenums 68, 69 are connected through a large area of their central portions by a connector portion 76 containing a valve 77 which is operable to close or open communication of the plenums through the connector. The engine cylinders are timed so that the intake strokes of the two cylinders connected to each plenum are equally spaced in the cycle of engine operation. Thus, the tuning of the intake system is effective to charge each of the cylinders in a substantially equal manner.

Operation of the system is essentially like that of the embodiment illustrated in FIGS. 4 and 5, recognizing however that the actual tuning effects will differ because of the differing number of cylinders connected with the plenums. Nevertheless, operation of the valve 77 in the connector portion 76 is effective to provide a variation in the tuning effect in the same manner as with the previously described embodiments.

While the invention has been described by reference to certain selected embodiments, it should be understood that numerous changes could be made in the form and details of the arrangements described without departing from the spirit and scope of the inventive concepts disclosed. Accordingly, the invention is intended to be limited only by the language of the following claims.

The embodiments of the invention in which an exclusive property or privilege is claimed are defined as follows:

1. A modulated tuning intake system for a V-type internal combustion engine having a pair of adjacent longitudinal cylinder banks containing a plurality of cylinders each included in one of two cylinder groups, a longitudinally elongated manifold plenum for each group and runners connecting each plenum with the cylinders of its respective group, said manifold plenums extending longitudinally in laterally spaced side by side relationship with one another and the adjacent cylinder banks, a common chamber for the system, a pair of conduits, one connecting each manifold plenum with the common chamber, said system being tuned to provide an enhanced level of cylinder charging volume in a predetermined lower range of engine speeds, and the improvement comprising a connector laterally joining the dual manifold plenums continuously along at least half their longitudinal extent and providing a large area passage internally communicating the separate plenums to effectively provide a single larger plenum and thereby modify the system tuning so as to provide an enhanced level of cylinder charging volume in a higher range of engine speeds above said lower range, and valve means in said passage and movable to selectively open and close the communication of said separate plenums and thereby respectively provide the lower and higher speed ranges of enhanced cylinder charging for the intake system.

2. An intake system according to claim 1 and further including means for actuating said valve means as a function of engine speed to modulate the system tuning to its most efficient charging mode over at least a major portion of the engine speed range.

* * * * *